United States Patent
Ando (10) Patent No.: US 6,481,532 B1
(45) Date of Patent: Nov. 19, 2002

(54) COMMUNICATION DEVICE FOR ELEVATOR

(75) Inventor: Hiroshi Ando, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/958,820

(22) PCT Filed: Mar. 30, 2000

(86) PCT No.: PCT/JP00/02029

§ 371 (c)(1), (2), (4) Date: Oct. 15, 2001

(87) PCT Pub. No.: WO01/74701

PCT Pub. Date: Oct. 11, 2001

(51) Int. Cl.$^7$ .................................. B66B 1/28
(52) U.S. Cl. ........................ 187/247; 187/391
(58) Field of Search .................. 187/247, 248, 187/391, 393, 414; 710/11; 709/230; 379/93.31; 370/465, 466, 467; 340/825.5, 825.51

(56) References Cited

U.S. PATENT DOCUMENTS

| | | | | |
|---|---|---|---|---|
| 4,683,989 A | * | 8/1987 | Pillage et al. | 187/380 |
| 4,724,520 A | | 2/1988 | Athanas et al. | |
| 4,958,707 A | * | 9/1990 | Yoneda et al. | 187/247 |
| 5,854,454 A | * | 12/1998 | Upender et al. | 187/247 |
| 5,936,211 A | | 8/1999 | Kim | |
| 6,062,343 A | * | 5/2000 | Wang | 187/247 |
| 6,349,795 B1 | * | 2/2002 | Tatsumi et al. | 187/247 |
| 6,378,662 B1 | * | 4/2002 | Yamada | 187/247 |

FOREIGN PATENT DOCUMENTS

| | | |
|---|---|---|
| JP | 5-110620 | 4/1993 |
| JP | 10-182023 | 7/1998 |

* cited by examiner

Primary Examiner—Jonathan Salata
(74) Attorney, Agent, or Firm—Leydig, Voit & Mayer, Ltd.

(57) ABSTRACT

A communication apparatus for elevators includes at least two elevator communication networks through which data is communicated with different protocols, and a network protocol converter connected between those networks. The network protocol converter includes a dual port memory for transferring ordinary data, a register memory for transferring priority data with read/write processing at shorter intervals, and a network controller provided in each of the communication networks for selectively choosing one of the dual port memory and the register memory to perform ordinary data transfer and priority data transfer. Since the least necessary data is transferred with priority via the register memory, protocol conversion and data transfer can be performed with minimum interference with the processing of the network controller and delay in data transfer can be minimized.

8 Claims, 7 Drawing Sheets

PRIORITY DATA

COMMUNICATION DEVICE FOR ELEVATOR

TECHNICAL FIELD

The present invention relates to a communication apparatus for elevators, and more particularly to a communication apparatus applied to an elevator system that includes plural types of communication paths having different communication protocols from each other.

BACKGROUND ART

Figure 8:
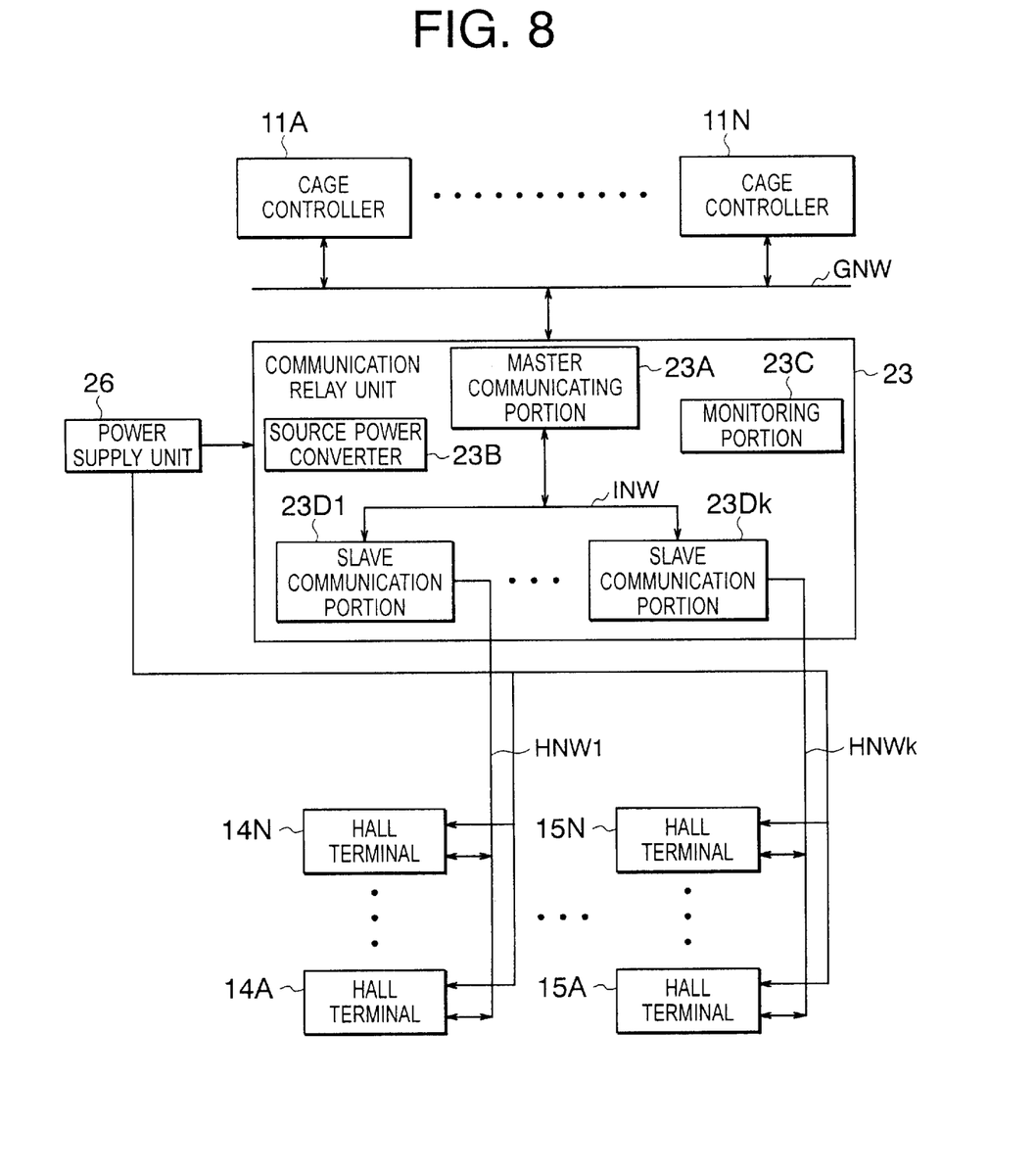
FIG. 8 shows a construction of a conventional similar communication apparatus for elevators.
Figure 9:
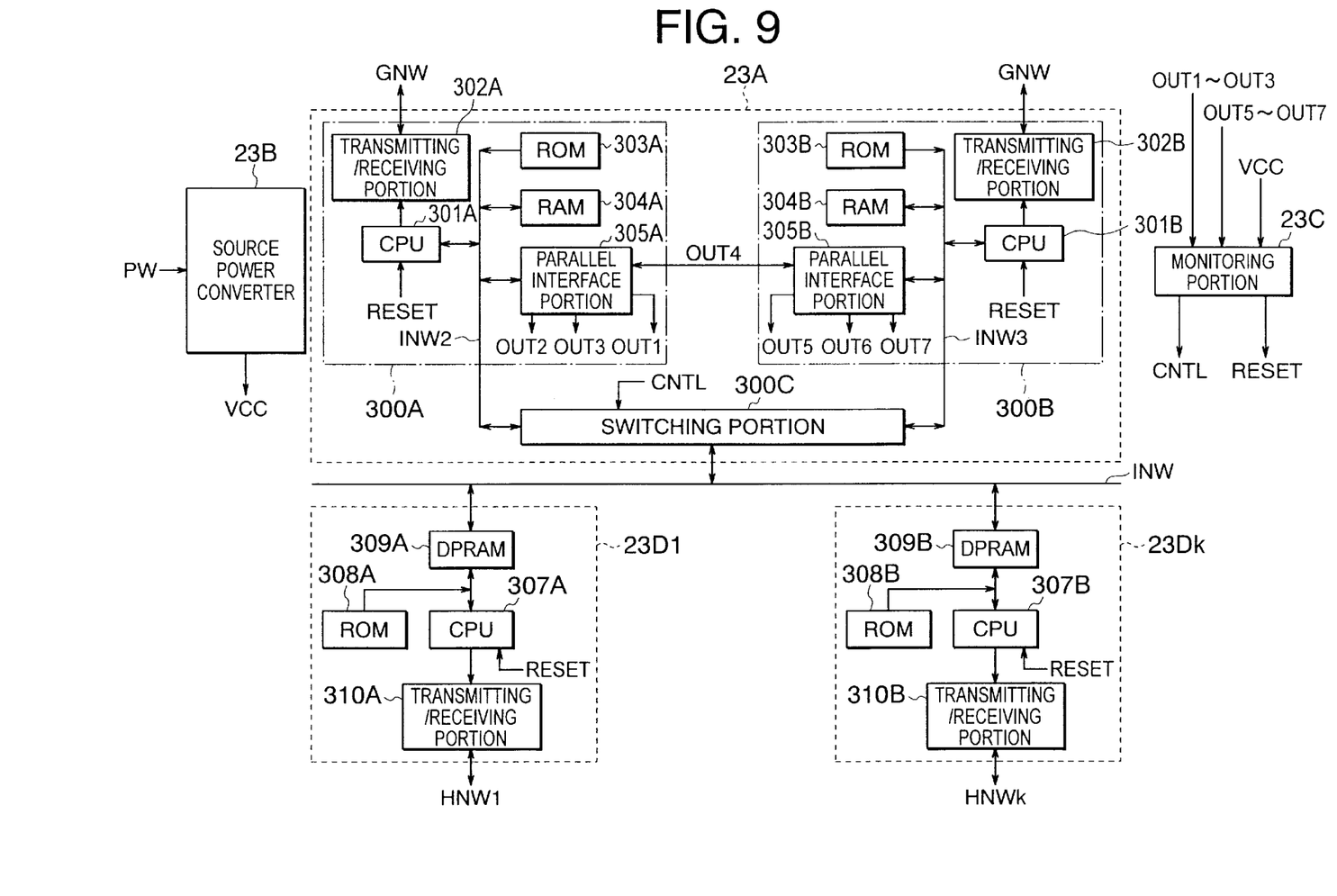
FIG. 9 shows one example of hardware configuration of a communication relay unit in FIG. 8.

FIG. 8 shows a construction of the above type of conventional communication apparatus for elevators disclosed in Japanese Unexamined Patent Application Publication No. 10-182023, for example, and FIG. 9 shows one example of hardware configuration of a communication relay unit 23 in FIG. 8. Referring to FIG. 8, 11A–11N each denote a cage controller, GNW denotes a group network to which the cage controllers 11A–11N and a master communicating portion 23A of the communication relay unit 23 are connected, and 23 denotes the communication relay unit. HNW1–HNWk denote hall networks to which hall terminals 14–15 provided for each elevator line and slave communicating portions 23D1–23Dk of the communication relay unit 23 are connected respectively, and 26 denotes a power supply unit.

In the communication relay unit 23, 23A denotes the master communicating portion, 23B denotes a source power converter, 23C denotes a monitoring portion, 23D1–23Dk each denote a slave communicating portion, and INW denotes an internal network for connecting the slave communicating portions 23D1–23Dk to the master communicating portion 23A.

Also, in the master communicating portion 23A shown in FIG. 9, 300A and 300B denote communicating portions in parallel, 300C denotes a switching portion, 301A and 301B each denote a CPU, 302A and 302B each denote a transmitting/receiving portion, 303A and 303B each denote a ROM, 304A and 304B each denote a RAM, and 305A and 305B each denote a parallel interface portion. Further, in the slave communicating portions 23D1 and 23Dk, 307A and 307B each denote a CPU, 308A and 308B each denote a ROM, 309A and 309B each denote a DPRAM, and 310A and 310B each denote a transmitting/receiving portion.

The operation will be briefly described below. Two different networks GNW and HNW are connected to each other via the communication relay unit 23. The master communicating portion 23A of the communication relay unit 23 controls the network GNW, and the slave communicating portions 23D1–23Dk control respectively the networks HNW1–HNWk. In the communication relay unit 23, as shown in FIG. 9, the master communicating portion 23A and the slave communicating portions 23D1–23Dk transfer data between them via the dual port memories (DPRAM) 309.

However, there has been a problem that the master communicating portion 23A and the slave communicating portions 23D1–23Dk cannot read data that has been written by the CPU on the opposite side until their CPUs 301 A, 301B, 307A and 307B have finished writing of all data, and a delay in data transfer occurs.

An object of the present invention is therefore to provide a communication apparatus for elevators which can avoid a delay in data transfer for data that requires high-speed transfer.

DISCLOSURE OF THE INVENTION

According to a first aspect of the present invention, in a communication apparatus for elevators, a network protocol converter connected between at least two elevator communication networks, through which data is communicated with different protocols, includes a dual port memory for ordinary data transfer and a register memory for priority data transfer with interrupts at shorter intervals.

According to a second aspect of the present invention, the above communication apparatus for elevators comprises at least two elevator communication networks through which data is communicated with different protocols, and a network protocol converter connected between those networks, the network protocol converter including a dual port memory for transferring ordinary data, a register memory for transferring priority data with read/write processing at shorter intervals, and a network controller provided in each of the communication networks for selectively choosing one of the dual port memory and the register memory to perform the ordinary data transfer and the priority data transfer.

According to a third aspect of the present invention, the network controller includes a memory storing respective read/write cycles of the dual port memory and the register memory and priority data, means for setting the read/write cycles and the priority data which are stored in the memory, and network data transfer control means for, in accordance with the read/write cycles and the priority data having been set, performing the ordinary data transfer via the dual port memory and the priority data transfer for the set predetermined priority data via the register memory.

According to a fourth aspect of the present invention, the elevator communication network generates a predetermined priority transfer signal prior to data to be subjected to the priority data transfer, and the network controller includes a memory storing respective read/write cycles of the dual port memory and the register memory, means for setting the read/write cycles stored in the memory, and network data transfer control means for, in accordance with the read/write cycles having been set, performing the ordinary data transfer via the dual port memory, and when the priority transfer signal is received, performing the priority data transfer for data of a predetermined length subsequent to the priority transfer signal via the register memory.

According to a fifth aspect of the present invention, the network protocol converter includes, as the register memory for the priority data transfer, a pair of FIFO register memories capable of reading and writing data respectively only in one direction to perform data transfer in opposite directions.

BRIEF DESCRIPTION OF THE INVENTION

BEST MODE FOR CARRYING OUT THE INVENTION

Embodiment 1

Figure 1:
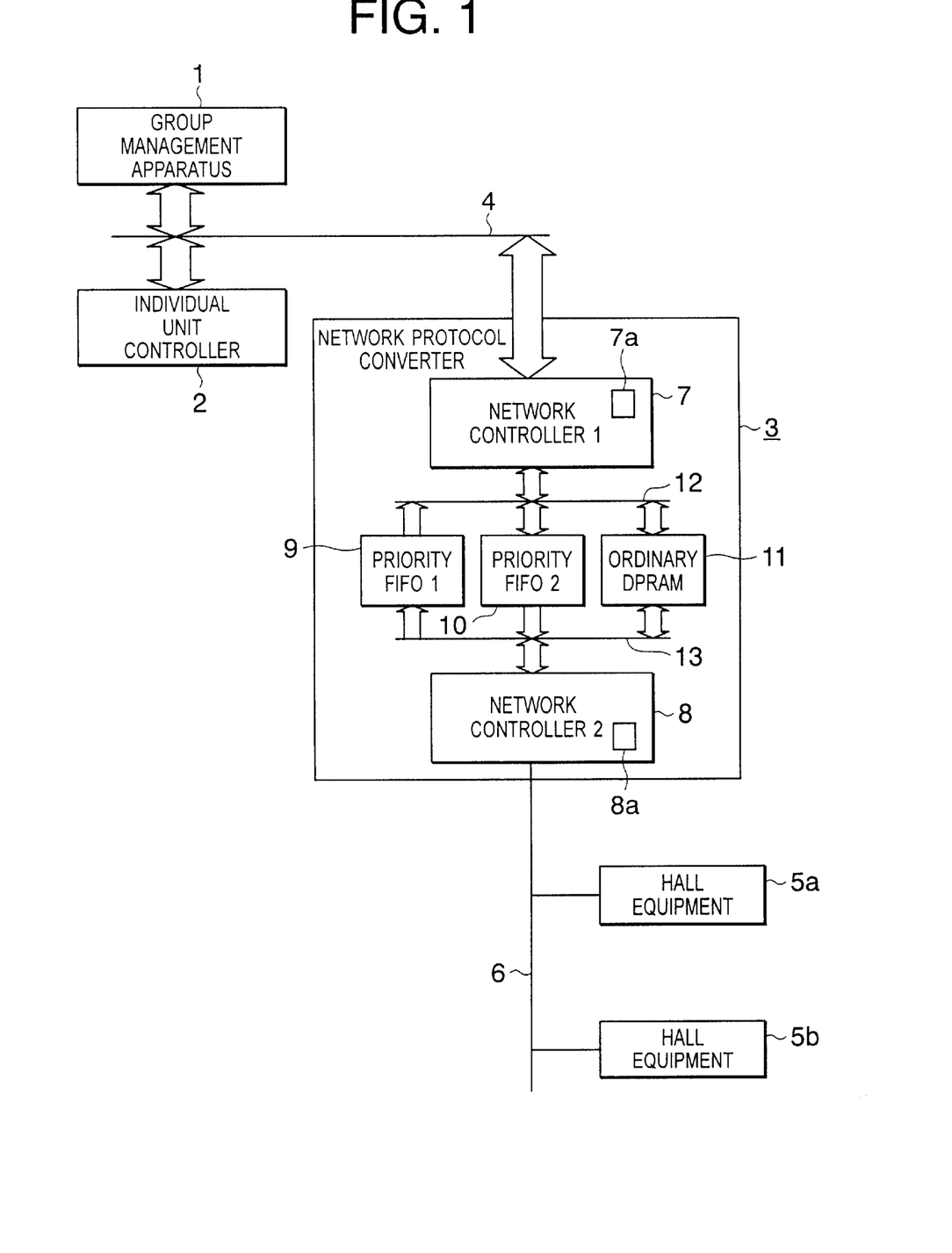
FIG. 1 shows one example of construction of a communication apparatus for elevators according to the present invention.

FIG. 1 shows one example of construction of a communication apparatus for elevators according to the present invention. Referring to FIG. 1, numeral 1 denotes a group management apparatus for the elevators, 2 denotes each individual unit controller provided in each elevator of an elevator system, 4 denotes a group management communication network for connecting the group management apparatus 1 and a plurality of individual unit controllers 2 via a network, 5a–5b denote hall equipment provided in respective floors associated with one elevator line, 6 denotes a hall equipment communication network for connecting the hall equipment 5a–5b associated with one elevator line via a network, and 3 denotes a network protocol converter connecting the group management communication network 4 and the hall equipment communication network 6 to each other.

In the network protocol converter 3, numeral 7 denotes a network controller (hereinafter referred to as NC1) which is connected to the side of the group management communication network 4 and incorporates a program ROM, a RAM and a timer (not specifically shown) therein. 8 denotes a similar network controller (NC2) which is provided in one-to-one relation to the hall equipment communication network 6 for each elevator line and is connected to it.

Numeral 9 denotes a register memory (hereinafter referred to as FIFO1) which is constructed as a FIFO (First-In First-Out) register memory and is employed for data transfer from the NC2 to NC1. Likewise, 10 denotes a register memory (hereinafter referred to as FIFO2) which is constructed as a FIFO (First-In First-Out) register memory and is employed for data transfer from the NC1 to NC2. 11 denotes a dual port memory (hereinafter referred to as DPRAM) provided between the NC1 and the NC2. Then, 12 denotes a data bus for the NC1 and 13 denotes a data bus for the NC2.

Figure 2:
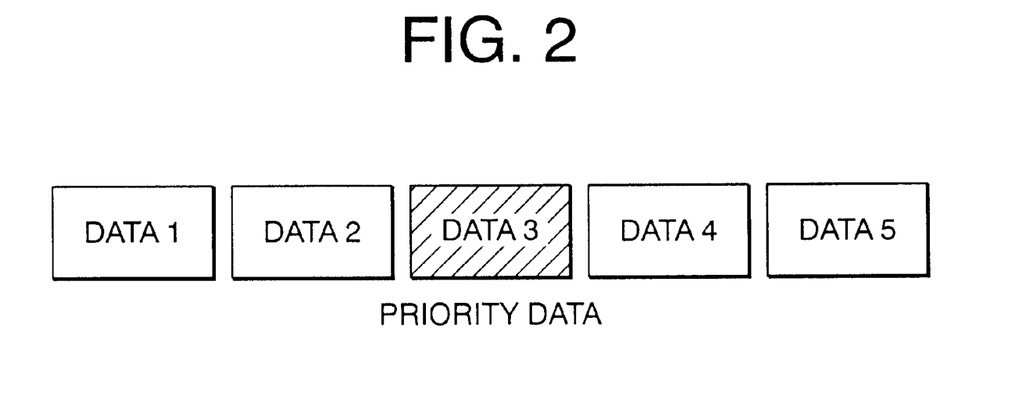
FIG. 2 shows one example of a transmission state of network data in Embodiment 1 of the present invention.
Figure 3:
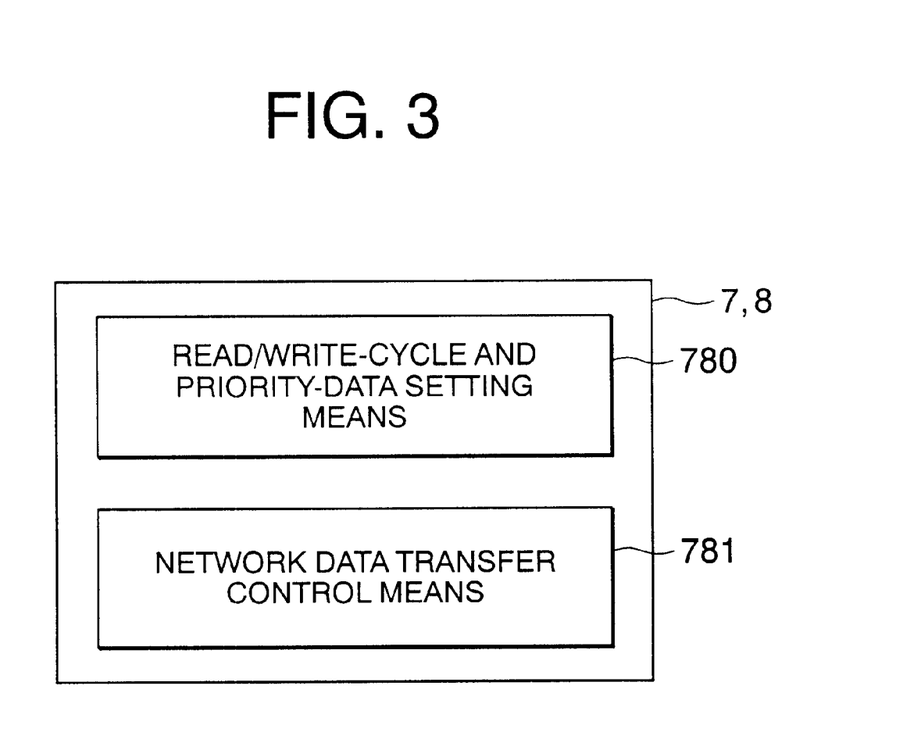
FIG. 3 is a functional block diagram of a network controller in Embodiment 1 of the present invention.
Figure 4:
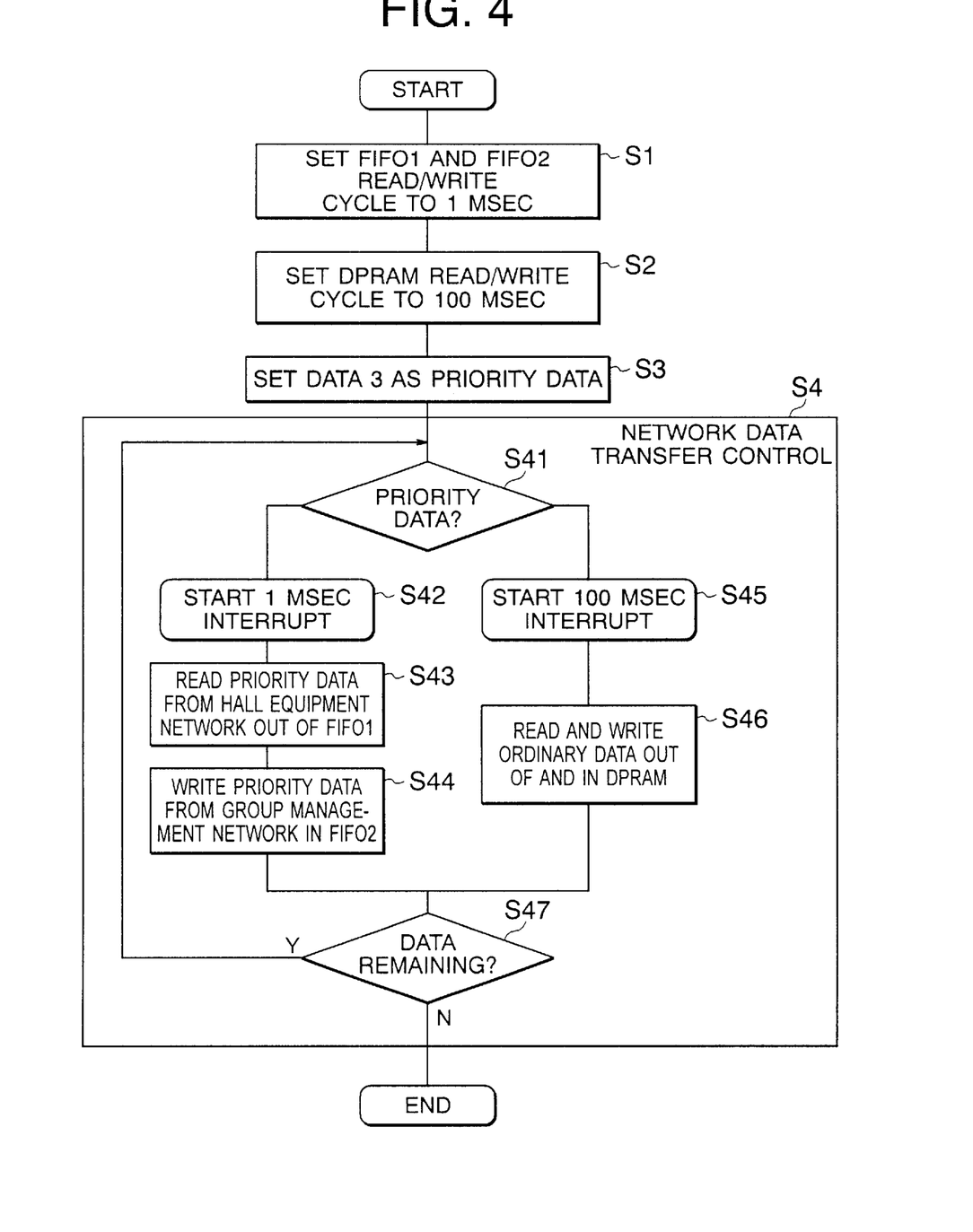
FIG. 4 is a flowchart showing the operation of the network controller in Embodiment 1 of the present invention.

Further, FIG. 2 shows one example of a transmission state of network data (transmitted data and received data) in Embodiment 1 of the present invention. FIG. 3 is a functional block diagram of a network controller in Embodiment 1 of the present invention. FIG. 4 is a flowchart showing the operation of the network controller in Embodiment 1 of the present invention. A read/write-cycle and priority-data setting means 780 in FIG. 3 corresponds to steps S1–S3 in FIG. 4, and a network data transfer control means 781 in FIG. 3 corresponds to step S4 in FIG. 4.

After the star of processing, the NC1 executes steps S1–S3 in FIG. 4 to set respective access cycles of the FIFO1 and the FIFO2, an access cycle of the DPRAM 11, and data to be processed as priority data (e.g., data 3 in FIG. 2). This setting is performed, for example, by storing those data in a memory 7a incorporated in the NC1 (or a memory 8a in the NC2) beforehand and reading the stored data. There after, ordinary processing of the group management network 4 is started.

In the ordinary network processing, the transmitted and received data is temporarily stored in another internal buffer memory (not shown) incorporated in the NC1. Then, only the previously set data 3, shown in FIG. 2, is transferred with priority via the FIFO1 and the FIFO2 upon interrupts occurred at short intervals set to 1 msec (steps S41–S44). Other data is transferred upon interrupts occurred at long intervals set to, e.g., 100 msec (steps S41 and S45–S46).

Stated otherwise, only the least necessary data is transferred via the FIFO1 and the FIFO2 with short interrupt intervals, and other data is transferred via the DPRAM 11. Therefore, protocol conversion and data transfer can be performed with minimum interference against the processing of the group management network 4 in the NC1. Further, a delay in transfer can be suppressed for the data for which high-speed data transfer is required.

Note that, although a detailed description of the processing in the NC2 is omitted here, similar processing to the above-described one in the NC1 is executed with respect to the NC1 and the hall equipment network 6.

Embodiment 2

Figure 5:
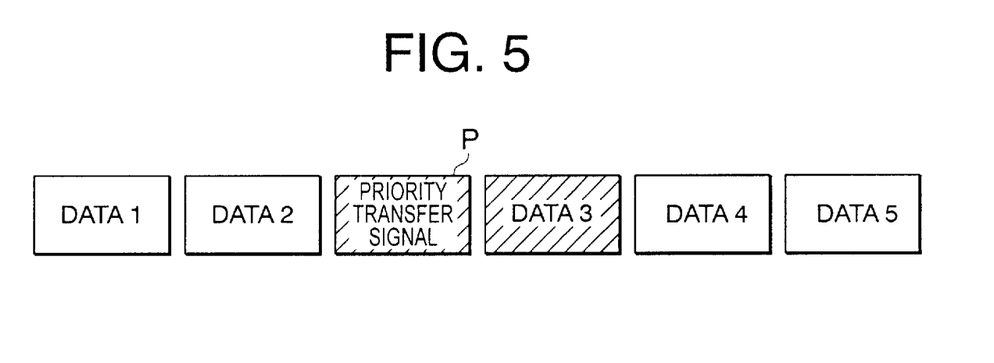
FIG. 5 shows one example of a transmission state of network data in Embodiment 2 of the present invention.
Figure 6:
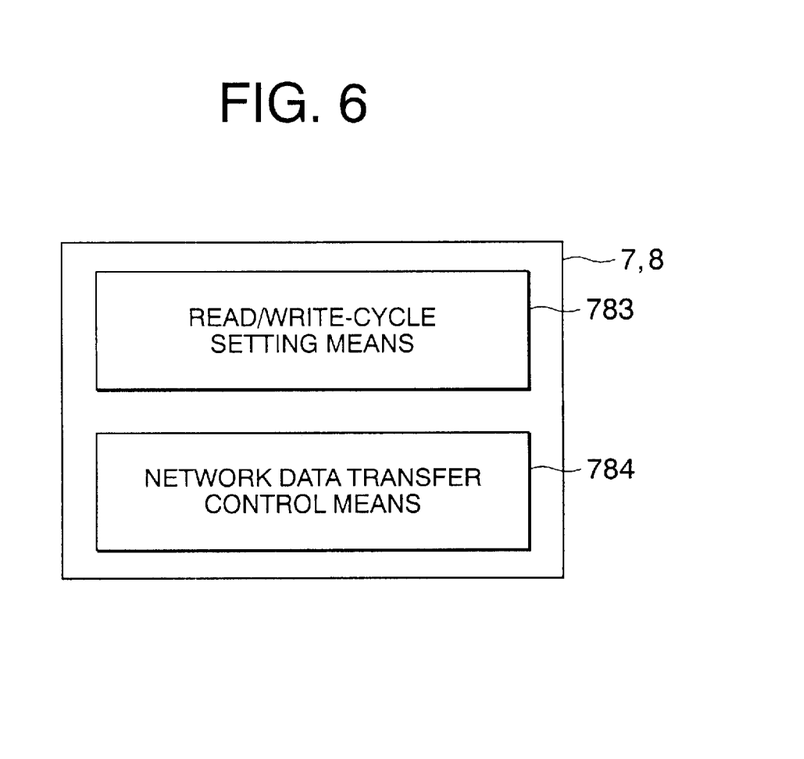
FIG. 6 is a functional block diagram of a network controller in Embodiment 2 of the present invention.
Figure 7:
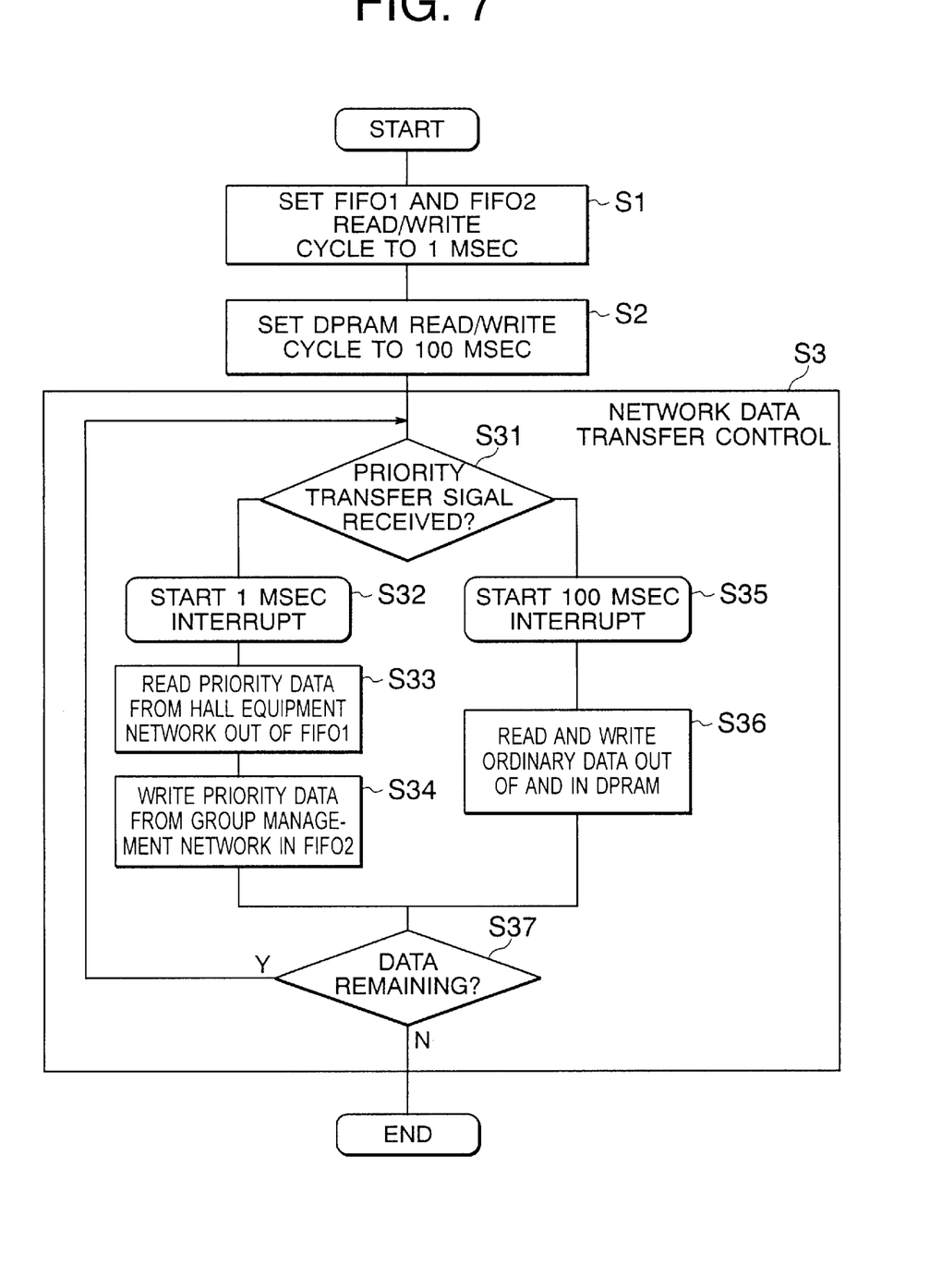
FIG. 7 is a flowchart showing the operation of the network controller in Embodiment 2 of the present invention.

A communication apparatus for elevators according to another embodiment of the present invention will be described below. The construction of the communication apparatus for elevators is basically the same as shown in FIG. 1. FIG. 5 shows one example of a transmission state of network data (transmitted data and received data) in this embodiment. FIG. 6 is a functional block diagram of a network controller, i.e., NC1 or NC2, in this embodiment. FIG. 7 is a flowchart showing the operation of the network controller this embodiment. A read/write-cycle setting means 783 in FIG. 6 corresponds to steps S1 and S2 in FIG. 7, and a network data transfer control means 784 in FIG. 6 corresponds to step S3 in FIG. 7.

While the priority data is set in the NC1 beforehand in Embodiment 1 described above, a priority transfer signal is designated in a data stream passing over a network in this embodiment.

After the star of processing, the NC1 executes steps S1 and S2 in FIG. 7 to set respective access cycles of the FIFO1 and the FIFO2 and an access cycle of the DPRAM 11. This setting is performed, for example, by storing those data in a memory 7a incorporated in the NC1 (or in a memory 8a in the NC2) beforehand and reading the stored data. Thereafter, ordinary processing of the group management network 4 is started.

Then, in step S31 of the network transfer control represented by step S3, the NC1 waits for a priority transfer signal P shown in FIG. 5. If the priority transfer signal P is not received, the ordinary network processing is executed via the DPRAM 11 (steps S31 and S35–S36). If the priority transfer signal P shown in FIG. 5 is receive in step S31, only data immediately subsequent to the received priority transfer signal P, e.g., data 3 in FIG. 5, is recognized as data to be subjected to priority transfer processing, and only the data 3 is transferred with priority directly via the FIFO1 and the FIFO2 upon interrupts occurred at short intervals (1 msec) (steps S31–S34). Other data is transferred through the ordinary processing upon interrupts occurred at long intervals (100 msec) as with the above case (steps S31 and S35–S36). Incidentally, the number or length of data transferred with priority can be selectively set to any suitable value.

Thus, also in this embodiment, only the least necessary data is transferred with priority via the FIFO1 and the FIFO2 upon short interval interrupts, and other data is transferred via the DPRAM upon long interval interrupts. Therefore, protocol conversion and data transfer can be performed with minimum interference with the control process of the group management network 4 in the NC1. Further, a delay in data transfer can be minimized for the data for which high-speed data transfer is required.

In this embodiment, particularly, since the priority transfer signal is included in a data stream pa sing over the network and the NC1 can be controlled from the network side, the s stem configuration is more flexible than Embodiment 1 in which the priority signal is set with a program beforehand. This feature leads to, for example, such an advantage that even when the data to be transferred with priority is changed, the changed data can be transferred with priority simply by inserting the priority transfer signal immediately before that data.

As with Embodiment 1, although a detailed description of the processing in the NC2 is omitted here, similar processing to the above-described one in the NC1 is executed with respect to the NC1 and the hall equipment network 6.

Industrial Applicability

According to the first aspect of the present invention, as described above, in a communication apparatus for elevators, a network protocol converter connected between at least two elevator communication networks, through which data is communicated with different protocols, includes a dual port memory for ordinary data transfer and a register memory for priority data transfer with interrupts at shorter intervals. Therefore, data that requires high-speed transfer can be processed trough the priority data transfer with interrupts at shorter intervals, thus enabling data to be transferred with a minimum transfer delay.

Also, according to the second aspect of the present invention, the above communication apparatus for elevators comprises at least two elevator communication networks through which data is communicated with different protocols, and a network protocol converter connected between those networks, the network protocol converter including a dual port memory for transferring ordinary data, a register memory for transferring priority data with read/write processing at shorter intervals, and a network controller provided in each of the communication networks for selectively choosing one of the dual port memory and the register memory to perform the ordinary data transfer and the priority data transfer. Thus, the least necessary data is transferred with priority via the register memory. Therefore, protocol conversion and data transfer can be performed with minimum interference against the processing of the network controller, and a delay in data transfer can be minimized.

Further, according to the third aspect of the present invention, the network controller includes a memory storing respective read/write cycles of the dual port memory and the register memory and priority data, means for setting the read/write cycles and the priority data which are stored in the memory, and network data transfer control means for, in accordance with the read/write cycles and the priority data having been set, performing the ordinary data transfer via the dual port memory and the priority data transfer for the set predetermined priority data via the register memory. Therefore, the read/write cycles and the priority data, which are previously stored in the memory, are set in the network controller so that the ordinary data transfer and the priority data transfer are switched over in an automatic way.

Moreover, according to the fourth aspect of the present invention, the elevator communication network generates a predetermined priority transfer signal prior to data to be subjected to the priority data transfer, and the network controller includes a memory storing respective read/write cycles of the dual port memory and the register memory, means for setting the read/write cycles stored in the memory, and network data transfer control means for, in accordance with the read/write cycles having been set, performing the ordinary data transfer via the dual port memory, and when the priority transfer signal is received, performing the priority data transfer for data of a predetermined length subsequent to the priority transfer signal via the register memory. Therefore, even when the data to be transferred with priority is changed, the changed data can be transferred with priority simply by inserting the priority transfer signal immediately before that data.

Furthermore, according to the fifth aspect of the present invention, the network protocol converter includes, as the register memory for the priority data transfer, a pair of FIFO register memories capable of reading and writing data respectively only in one direction to perform data transfer in opposite directions. Therefore, the register memory for the priority data transfer can be constructed with ease. In addition, there is need of neither starting to read data after waiting the end of data writing, nor conversely starting to write data after waiting the end of data reading.

What is claimed is:

1. A communication apparatus for elevators including:

a network protocol converter connected between at least two elevator communication networks, through which data is communicated with different protocols, a dual port memory for ordinary data transfer, and a register memory for priority data transfer with interrupts at shorter intervals than said dual port memory.

2. A communication apparatus for elevators comprising:

at least two elevator communication networks through which data is communicated with different protocols, and a network protocol converter connected between said networks, said network protocol converter including:

a dual port memory for ordinary data transfer, a register memory for priority data transfer with read/write processing at shorter intervals than said dual port memory, and a network controller in each of said communication networks for selectively choosing one of said dual port memory and said register memory for the ordinary data transfer and the priority data transfer.

3. The communication apparatus for elevators according to claim 2, wherein said network controller includes:

a memory storing respective read/write cycles of said dual port memory and said register memory and priority data, means for setting the read/write cycles and the priority data which are stored in said memory, and network data transfer control means for, in accordance with the read/write cycles and the priority data set, performing the ordinary data transfer via said dual port memory and the priority data transfer for the priority data set via said register memory.

4. The communication apparatus for elevators according to claim 2, wherein said elevator communication network generates a priority transfer signal prior to transfer of data for the priority data transfer, and said network controller includes:

a memory storing respective read/write cycles of said dual port memory and said register memory, means for setting the read/write cycles stored in said memory, and network data transfer control means for, in accordance with the read/write cycles set, performing the ordinary data transfer via said dual port memory, and, when the priority transfer signal is received, performing the priority data transfer for data of a first length, subsequent to receipt of the priority transfer signal, via said register memory.

5. The communication apparatus for elevators according to claim 1, wherein said network protocol converter includes, as said register memory for the priority data transfer, a pair of FIFO register memories, each FIFO register memory for reading and writing data in only one direction, said pair of FIFO register memories providing data transfer in opposite directions.

6. The communication apparatus for elevators according to claim 2, wherein said network protocol converter includes, as said register memory for the priority data transfer, a pair of FIFO register memories, each FIFO register memory for reading and writing data in only one direction, said pair of FIFO register memories providing data transfer in opposite directions.

7. The communication apparatus for elevators according to claim 3, wherein said network protocol converter includes, as said register memory for the priority data transfer, a pair of FIFO register memories, each FIFO register memory for reading and writing data in only one direction, said pair of FIFO register memories providing data transfer in opposite directions.

8. The communication apparatus for elevators according to claim 4, wherein said network protocol converter includes, as said register memory for the priority data transfer, a pair of FIFO register memories, each FIFO register memory for reading and writing data in only one direction, said pair of FIFO register memories providing data transfer in opposite directions.

* * * * *